Jan. 12, 1965  D. F. MOLINE  3,165,132
CUTTER DRIVE FOR VEGETABLE JUICING MACHINE
Filed June 4, 1963

INVENTOR.
DOUGLAS F. MOLINE
BY
C. Ramon Maltby
ATTORNEY

United States Patent Office 3,165,132
Patented Jan. 12, 1965

3,165,132
CUTTER DRIVE FOR VEGETABLE
JUICING MACHINE
Douglas F. Moline, Arcadia, Calif., assignor to Acme Manufacturing Co., Inc., a corporation
Filed June 4, 1963, Ser. No. 285,271
3 Claims. (Cl. 146—76)

This invention relates to centrifugal machines and more especially to a drive for the cutting wheel of a vegetable juicing machine.

The present invention is directed to centrifugal type rotary machines in which the principal element is rotated at a relatively high speed, driving a cutting wheel or blade in a perforated basket, which cutting wheel shaves the vegetables in a manner to release the juices therein, the juices being centrifugated through the basket and being suitably collected, the pulp of the vegetables being retained in the basket. The cutting element comprises a disc having a plurality of radially arranged rows of teeth for effecting the cutting or shaving operation. Design and manufacturing procedures, though highly developed, are unable to produce a high rotation speed structure which is perfectly balanced, and as often occurs, small irregularities develop in the cutting blades or the teeth thereof. A single irregularity in one blade will cause an excess of the vegetable pulp to be lodged in the rotating basket at a particular circumferential position, and this unbalanced mass will become larger during the juicing operation and results in an undesirable vibration of the machine, the usual design of which provides for an unsecured support on a table or similar supporting object. This undesirable vibration of the machine is overcome by the present invention wherein the cutting blade wheel or disc has a slip or friction drive connection with the basket in which it is mounted and the shaft of the motor which powers the machine.

It is therefore, the principal object of this invention to provide a simple, practical and effective drive for the cutting wheel of a centrifuging machine wherein undesirable vibration is prevented.

Other objects and advantages will appear and be brought out more fully in the following specification, reference being had to the accompanying drawing wherein.

Figure 1:
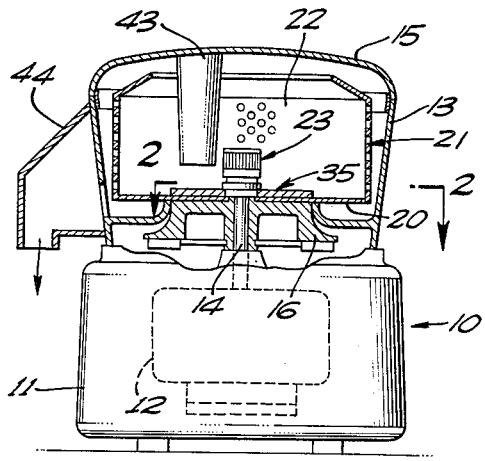
FIGURE 1 is a side elevation view partly in section of a vegetable juicing machine incorporating the present invention.

Referring more particularly to the drawing, FIGURE 1 shows a centrifugal vegetable juicing machine having a generally circular frame 10, the lower portion 11 of which houses an electric motor 12, and the upper detachable portion 13 of which forms an enclosure for a macerating unit mounted on the vertical shaft 14 of the motor. A removable cover 15 is suitably secured on the upper portion 13 of the frame. A hub 16 having high rotational inertia is suitably secured on shaft 14 and has a hexagonal shaft extension portion 18 which extends through a hexagonal aperture 19 in the bottom 20 of a rotating basket 21 which has a perforated circular wall 22.

A clamp nut and clutch assembly 23 is secured on the upper end of shaft 14. This assembly includes a retainer nut having a threaded bore secured on the threaded upper end of shaft 14. Nut 24 has an end bore or recess 25 into which extension 18 of the hub 16 extends in such manner that the clamping nut locks the bottom plate 20 of the basket 21 on hub 16. A cap 26 has a blind bore 27 in which extends the reduced upper end of nut 24. Cap 26 has a counterbore 30 in which extends the reduced diameter portion 31 of a plunger sleeve 32 which is pressed downwardly by the compression of a spring 33 which seats on an internal flange 34 of the plunger sleeve. The upper end of spring 33 is held under compression in the counterbore 30 of cap 26. Sleeve 32 has diametral cam notches 28 at its upper end. A locking pin 29 extends through cap 26 and nut 24 and rides on cam notches 28 which have an effective cam angle of substantially 30 degrees.

A macerating cutting wheel or disc 35 is positioned on bottom plate 20 of basket 21 and has a central opening 36 in which the lower end of nut 24 extends and by which the disc is rotationally centered for drive by hub 16 on shaft 14. The bore of the plunger sleeve is larger than nut 24 and the plunger sleeve is pressed downwardly on macerating disc 35 by the pressure of spring 33. An annular groove 38 is formed on the under side of macerating disc 35 and receives a nylon ring 40 which is formed with a plurality of circumferentially spaced feet 41 which rest on bottom plate 20 of basket 21.

The upper surface of macerating disc 35 is formed with a plurality of substantially radially arranged macerating tooth formations 42. These tooth formations are each in the form of a shell having rounded, sloping and tapering shape at their trailing edges, and a thin curved lip at the leading edge thereof in the direction of rotation of the disc. Cover 10 has a vegetable feeding guide tube 43 and bottom portion 13 is formed with a discharging spout 44.

The operation of the invention should be clear from the foregoing description. During running of motor 12 the comminuting unit will be rotated at high speed, such as two to three thousand revolutions per minute, and vegetables, such as carrots, celery, and others will be fed through feed guide tube 43 to the macerating disc wheel 35. The macerating wheel shaves or macerates the vegetables, and the juice therefrom is delivered through the dispensing spout 44. The entrapped pulp from the vegetables is deposited on the wall 22 of basket 21.

Figure 4:
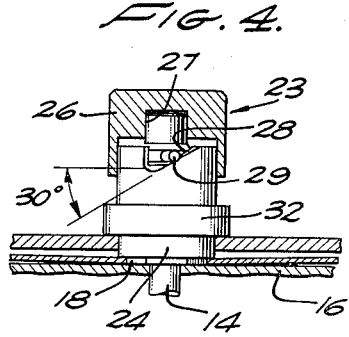
FIGURES 4 and 5 are separate views of the clamp nut.
Figure 2:
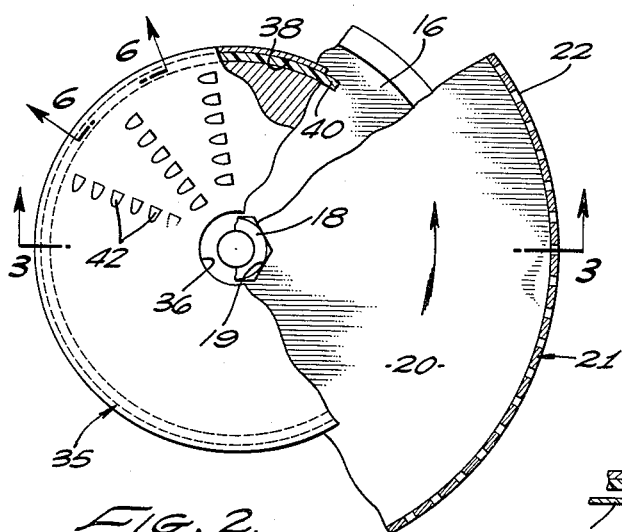
FIGURE 2 is a partial sectional view enlarged, taken along the line 2—2 of FIGURE 1.
Figure 5:
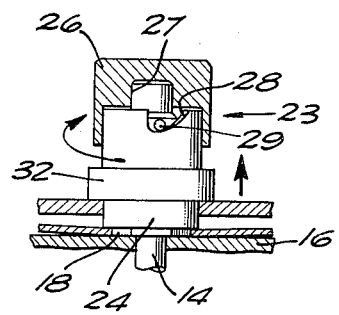
Figure 6:
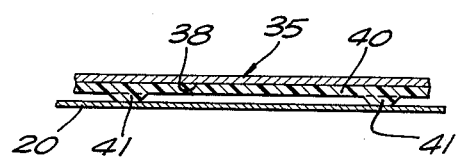
FIGURE 6 is a partial sectional view enlarged, taken along the arc line 6—6 of FIGURE 2.
Figure 3:
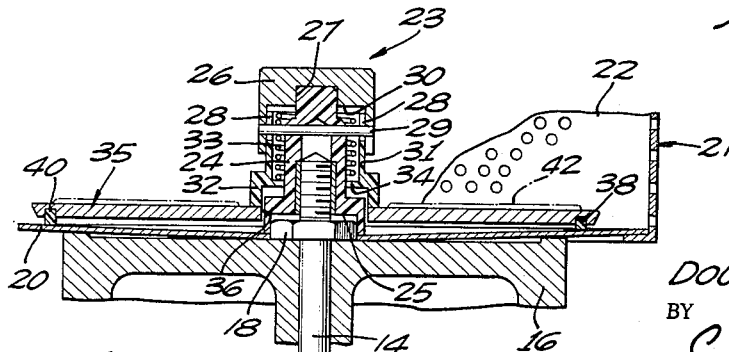
FIGURE 3 is a partial sectional view enlarged, taken along the line 3—3 of FIGURE 2.

As will be clear, the macerating disc 35 is driven from bottom plate 20 and the sleeve 32 of the clamping nut assembly 23 by a frictional drive engagement through nylon ring 40 and nylon sleeve 32. This frictional drive engagement provides a certain amount of slip, the amount of which is determined by the design of spring 33 in order to provide the desired amount of pressure of sleeve 32 against cutter disc 35. By reason of this slip drive, the disc 35 will shift its position relative to basket 21, and any irregularities in tooth formations 42 which might result in an unbalanced accumulation of pulp at one side of the basket will be prevented and a balanced drive of the basket will occur at all times. Excessive slip during the macerating process may damage the friction drive, therefore if during the macerating process excessive slippage starts to occur between the basket bottom and the cutter feet, friction between the cutter and sleeve is decreased by the force generated by the 30 degree cam angle working against the pin and forcing the sleeve into the cutter, thereby reducing slippage. During this action sleeve 32 will shift temporarily from the position shown in FIGURE 5 to that shown in FIGURE 4.

The invention has been described in considerable detail in order to comply with the patent laws by providing a full public disclosure of at least one of its forms. However, such detailed description is not intended in any way to limit the broad features or principles of the invention, or the scope of the patent monopoly to be granted.

What is claimed is:

1. In a high speed centrifugal vegetable juicing machine having a vertical shaft, a centrifugal hub and a perforate basket on said hub having a cylindrical wall; the combination of a base plate in said basket, a cutter disc on said base plate, means for clamping said base plate to said shaft, and resiliently biased friction drive means providing a small degree of slip between said base plate and cutter disc and preventing an unbalancing accumulation of vegetable pulp on said cylindrical wall by providing a constantly changing position of the cutter disc in relation to the perforated wall of the basket, said friction drive means including an annular groove in said cutter disc and a nylon friction member in said groove having a plurality of circumferentially spaced feet and a clamping nut and clutch assembly on said shaft having a spring seated nylon sleeve engaging said cutter disc and self actuating means to increase the pressure engagement of said sleeve and cutter disc and prevent excessive slippage.

2. Structure according to claim 1 wherein said means comprises a circumferential cam and pin engagement between said sleeve and clamping nut.

3. Structure according to claim 2 wherein said cam has an effective angle of substantially 30 degrees to the plane of said cutter disc.

References Cited by the Examiner

UNITED STATES PATENTS

| | | | |
|---|---|---|---|
| 2,870,653 | 1/59 | Koenig | 146—76 X |
| 3,085,606 | 4/63 | Moline | 146—76 |

J. SPENCER OVERHOLSER, *Primary Examiner.*